United States Patent
Huang et al.

(10) Patent No.: US 11,461,635 B2
(45) Date of Patent: Oct. 4, 2022

(54) NEURAL NETWORK TRANSFER LEARNING FOR QUALITY OF TRANSMISSION PREDICTION

(71) Applicant: NEC Laboratories America, Inc., Princeton, NJ (US)

(72) Inventors: Yue-Kai Huang, Princeton, NJ (US); Shaoliang Zhang, Princeton, NJ (US); Ezra Ip, West Windsor, NJ (US); Weiyang Mo, Sunnyvale, CA (US)

(73) Assignee: NEC CORPORATION

( * ) Notice: Subject to any disclaimer, the term of this patent is extended or adjusted under 35 U.S.C. 154(b) by 1035 days.

(21) Appl. No.: 16/153,018

(22) Filed: Oct. 5, 2018

(65) Prior Publication Data

US 2019/0108445 A1 Apr. 11, 2019

Related U.S. Application Data

(60) Provisional application No. 62/569,636, filed on Oct. 9, 2017.

(51) Int. Cl.
| | |
|---|---|
| *G06N 3/08* | (2006.01) |
| *H04B 10/556* | (2013.01) |
| *G06N 3/04* | (2006.01) |
| *H04B 10/077* | (2013.01) |
| *H04B 10/54* | (2013.01) |

(52) U.S. Cl.
CPC ............ *G06N 3/08* (2013.01); *G06N 3/0481* (2013.01); *G06N 3/082* (2013.01); *H04B 10/0775* (2013.01); *H04B 10/541* (2013.01); *H04B 10/5561* (2013.01)

(58) Field of Classification Search
CPC ........................................ G06N 3/08
See application file for complete search history.

(56) References Cited

U.S. PATENT DOCUMENTS

| | | | |
|---|---|---|---|
| 2004/0047639 A1* | 3/2004 | McAlexander | H04B 10/64 706/22 |
| 2018/0032869 A1* | 2/2018 | Tabaru | G06N 3/082 |
| 2018/0060724 A1* | 3/2018 | Wang | G06N 3/082 |

OTHER PUBLICATIONS

Dorner et al.; Deep Learning-Based Communication Over the Air; Jul. 11, 2017; https://arxiv.org/pdf/1707.03384.pdf (Year: 2017).*

Zhang et al., "Transfer Learning With Neural Networks for Bearing Fault Diagnosis in Changing Working Conditions," in IEEE Access, vol. 5, pp. 14347-14357, 2017, doi: 10.1109/ACCESS.2017.2720965 (Year: 2017).*

(Continued)

*Primary Examiner* — Nathan M Cors
(74) *Attorney, Agent, or Firm* — Joseph Kolodka

(57) ABSTRACT

Systems and methods for predicting performance of a modulation system are provided. A neural network model is trained using performance information of a source system. The neural network model is modified with transferable knowledge about a target system to be evaluated. The neural network model is tuned using specific characteristics of the target system to create a source-based target model. The target system performance is evaluated using the source-based target model to predict system performance of the target system.

17 Claims, 6 Drawing Sheets

(56) References Cited

OTHER PUBLICATIONS

Bouda, M. et al., "Accurate prediction of quality of transmission with dynamically configurable optical impairment model" Optical Fiber Communications Conference and Exhibition (OFC) (Mar. 2017), pp. 1-3.

Dai, W. et al., "Boosting for Transfer Learning" Proceedings of the 24 th International Conference on Machine Learning (2007) pp. 1-8.

Khan, F. et al., "Modulation format identification in heterogeneous fiber-optic networks using artificial neural networks" Optics express (May 2012) pp. 12422-12431, vol. 20, No. 11.

Mo, W. et al., "ANN-Based Transfer Learning for QoT Prediction in Real-Time Mixed Line-Rate Systems" Optical Society of America (May 14, 2018) pp. 1-3.

Ribeiro, V. et al., "Optical performance monitoring using the novel parametric asynchronous eye diagram" Optics Express (Apr. 2012) pp. 9851-9861, vol. 20, No. 9.

Xia, T. et al., "Transmission of 400G PM-16QAM Channels over Long-Haul Distance with Commercial All-Distributed Raman Amplification System and Aged Standard SMF in Field" Optical Society of America (Mar. 2014) pp. 1-3.

Yan, S. et al., "Field trial of Machine-Learning-assisted and SDN-based Optical Network Planning with Network-Scale Monitoring Database" IEEE 43rd European Conference on Optical Communication (ECOC 2017) (Sep. 2017) pp. 1-3.

Zibar, D. et al., "Nonlinear impairment compensation using expectation maximization for dispersion managed and unmanaged PDM 16-QAM transmission" Optics express (Dec. 2012) pp. 1-16, vol. 20, No. 26.

\* cited by examiner

NEURAL NETWORK TRANSFER LEARNING FOR QUALITY OF TRANSMISSION PREDICTION

RELATED APPLICATION INFORMATION

This application claims priority to U.S. Provisional Application No. 62/569,636, filed on Oct. 9, 2017, incorporated herein by reference herein its entirety.

BACKGROUND

Technical Field

The present invention relates to transfer learning methods and devices and more particularly, to predicting quality of transmission in transmission systems by employing neural networks.

Description of the Related Art

Emerging bandwidth hungry applications such as cloud computing, virtual machine migration, and high definition (HD) video rendering, are rapidly increasing the data traffic in optical transmission systems. High-capacity optical transmission systems need to support high-order modulation formats to keep up with demand.

In industry, upgrades from Quadrature Phase Shift Keying (QPSK) modulation format to 16-Quadrature Amplitude Modulation (16QAM) modulation format or even higher-order modulation formats are being implemented. However, under high-order modulation formats, there are many challenges that need to be resolved with fiber nonlinear effects compensation.

Self-phase modulation (SPM) and cross-phase modulation (XPM) are two main types of fiber nonlinear effects, which can highly degrade the system performance (e.g., degradation of channel's quality factor (Q-factor)). The impact of SPM and XPM can vary with different system architecture and channel loadings.

Dispersion managed links and dispersion unmanaged links have very large performance differences. As a result, predicting the system performance becomes very difficult. At present, there are no simple and accurate quality of transmission (QoT) models to predict the system performance after an upgrade due to the complexity of SPM and XPM.

SUMMARY

According to aspects of the present invention, systems and methods for predicting performance of a modulation system are provided. A neural network model is trained using performance information of a source system. The neural network model is modified with transferable knowledge about a target system to be evaluated. The neural network model is tuned using specific characteristics of the target system to create a source-based target model. The target system performance is evaluated using the source-based target model to predict system performance of the target system.

Another method for predicting performance of a modulation system includes providing a source-based neural network target model to predict system performance of a target system; operating the target system to transmit information over a transmission link and evaluating performance of the target system using the source-based neural network target model to predict performance of the target system based upon training information of a source system.

A transmission modulation system includes a target domain coupled to a transmission link, the target domain having first transmission system operating characteristics. A target performance model is associated with the target domain and includes a neural network to predict performance of the target system. The neural network is constructed based upon training information having second transmission system operating characteristics of a source system, wherein the first transmission system operating characteristics and the second transmission system operating characteristics are different.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
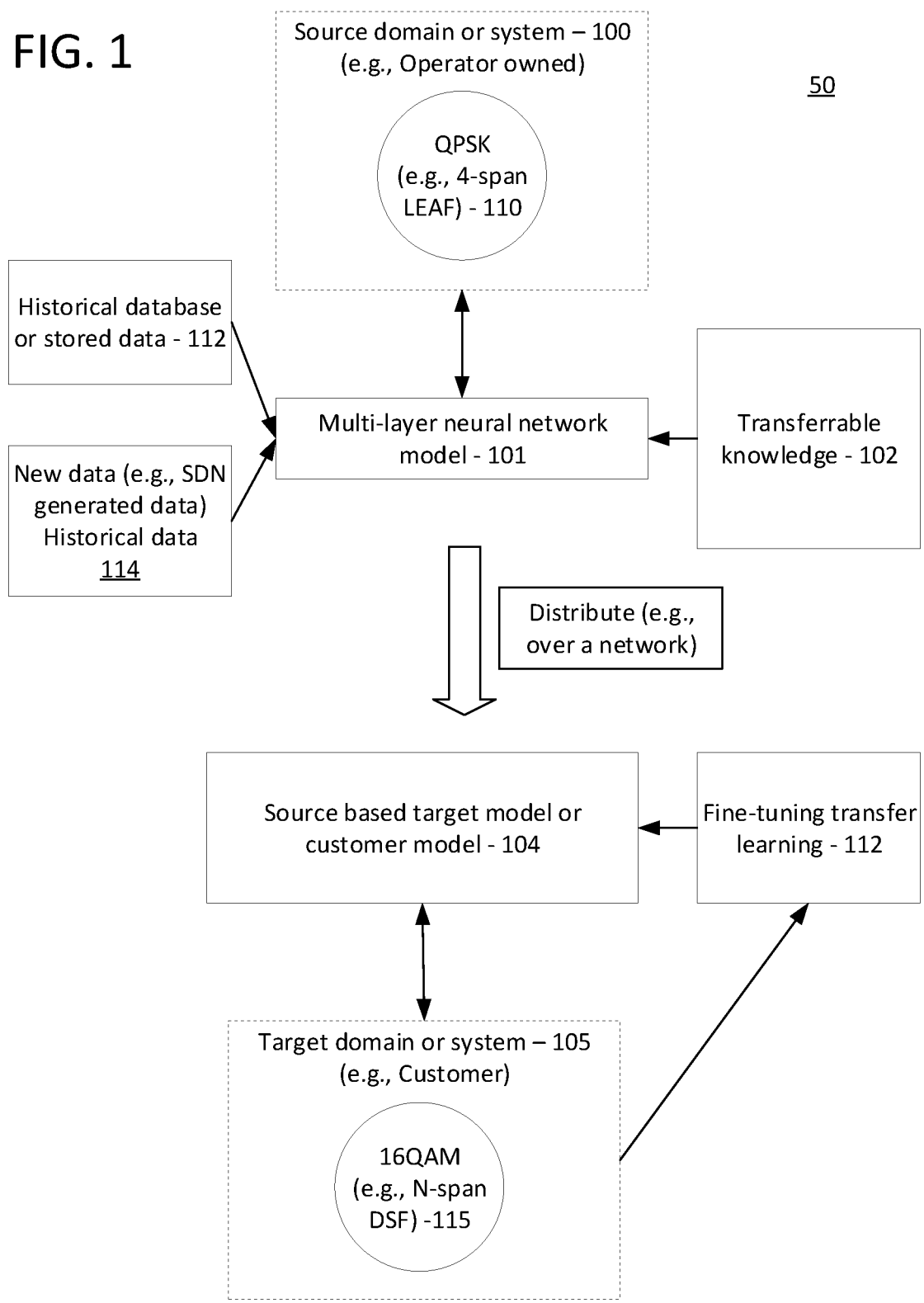
FIG. 1 is a block/flow diagram illustrating a system/method for training and operating a neural network for system performance evaluations of a target system based on source system training in accordance with the present invention.

In accordance with aspects of the present invention, systems and methods are provided that employ a neural network-based machine learning approach to predict system performance. In one embodiment, a neural network is developed to train an operator-owned transmission system, e.g., a Quadrature Phase Shift Keying (QPSK) transmission system, based on historic data measurements or new data collection. The knowledge of the trained model under the operator owned system can be transferred to customer systems with different modulation formats (e.g. 16QAM or beyond), transmission fibers and topologies.

Aspects of the present invention construct a neural network and predict system performance for other modulations format systems. The present embodiments consider possible performance variances in practical transmission systems (e.g., Erbium Doped Fiber Amplifier (EDFA) noise figures can be different from the specifications, temperature may change over the time, etc.). A transfer learning model is provided herein that can work with heterogeneous transmission systems. This can highly reduce the cost of re-training every new system from scratch.

The neural network-based machine learning approach employed herein can accurately predict channel quality factor (Q-factor) of optical transmission (QoT) systems. Further, a pre-trained neural network model under one particular system can be seamlessly transferred to different systems with only a small amount of data (e.g., transfer learning), while maintaining the prediction accuracy. This type of neural network-based Q-factor prediction approach can provide low complexity and high prediction accuracy.

The neural network-based Q-factor prediction approach does not require manual testing, and data collection can be automated by a controller, e.g., a software defined controller (SDN). Moreover, the neural network model that can be trained in one system (source domain system) can be transferred to other systems (target domain systems) without the need of retraining, and as a result this protects customer proprietary and reduces installation time. The neural network-based prediction is extendable to different types of performance metrics (e.g. power, signal to noise ratio (SNR), optical signal to noise (OSNR), bit error rate (BER), etc.). In one embodiment, online or network learning can be employed by incorporating machine learning into an SDN controller or the like, so that the prediction accuracy can improve over the time with more training data becoming available. Accurate quality of transmission (QoT) models are provided to predict system performance that considers the complexity of SPM and XPM and other characteristics.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a neural network-based transfer learning system 50 is shown illustratively for Q-factor prediction. In one aspect, a neural network (NN) based machine learning model 101 is trained for an optical transmission system (e.g., source domain 100) using historic data or measurements. The trained model 101 is employed to make system performance predictions on the same system 100. In one example, under known performance conditions and loads, performance criteria are measured, e.g., Q, BER, OSNR, etc. The performance obtained (output) is associated with the inputs, such that the model can be employed to predict the outputs under given input conditions. Here the neural network model 101 is trained as a baseline model that can be employed for customization for a customer or target system, e.g., target domain 105.

When preparing the NN model 101, a large amount of data can be employed to make the NN model 101 robust. Depending on a target system 105 to be employed, transfer learning methods can apply transfer knowledge 102 to the NN model 101 to adapt knowledge of performance conditions and operations for the target system 105 from the source system 100. As an example, if the source system 100 is a QPSK system 110, the transfer knowledge includes equivalent responses for the source system 100 and maps them to the target system 105. In one example, the target system 105 can be a 16QAM modulations system 115. Under given conditions, the source system performance may include a BER of x. Transfer knowledge 102 is employed to get the conditions for learning the condition for obtaining BER of x for the 16 QAM target system 105.

Transferrable knowledge 102 is provided in the form of tuning weights/coefficients established in the original source domain 100. This transferable knowledge 102 can be related to modulation information, channel power, or any other transmission related metrics or characteristic. To apply transfer learning, knowledge stored in the form of tuning weights in different layers of the neural network model 101 from the source domain system 100 is transferred to the target domain system 105. Only a small amount of new data from the target domain is needed to train the pre-trained weights (rather than train with randomly initialized weights), speeding up the training process.

In one aspect, a neural network, machine learning approach trains the model 101 using, e.g., an optical transmission system (source domain 100), although non-optical transmission system can also be employed, e.g., wired or wireless transmission systems. Historic measurements of the source domain 100 are employed for the training. The trained model 101 is used to make system performance predictions on the same system.

For source domain training, neural network training results are compared with other regression methods. A good model for the source domain 100 can provide small root mean square errors (RMSE) of about 0.50 dB or less, and, in one embodiment less than about 0.11 dB. The neural network node coefficients can then be transferable for target systems.

In one embodiment, the source domain system 100 can be a multi-span system with a commercially available modulation format (e.g., QPSK). For example, a four-span large effective area fiber (LEAF) system 110 including multiple channels (e.g., 11 channels) can be employed to train the neural network 101, with the defined input (e.g. channel input power) and system performance (e.g., channel Q-factor) as output. The training samples can be acquired from a historic data base 112 or from new or measured data 114 collected and stored during source domain operation.

After training the neural network model 101, the model 101 can be used to predict, e.g., the performance of unseen configurations for the same system. This can be provided without the need of actual performance data under that configuration as the trained neural network can provide accurate predictions. The trained model 101 predicts the performance of the same system for unseen configurations of that system (100). The prediction feeds a specific input (e.g., channel input power) into the neural network model 101, and the system performance will be predicted by the neural network model 101 (e.g., channel Q-factor). In one illustrative example, with a sufficient amount of training data, the accuracy of Q-factor prediction can achieve at least +/−0.4 dB error in a 4-span QPSK optical transmission system (e.g., source system 100).

There are different ways that the neural network model can be transferred to different target systems. In one example, a pure QPSK system neural network model can be transferred to a mixed QPSK/16QAM system.

In this example, an input layer (input vector y) can include channel power nodes (p) and modulation format nodes (m), and an output (x) includes a target channel Q-factor ($Q_t$).

$$\vec{x} = [p_1, p_2, \ldots, p_{11}, m_1, m_2, \ldots, m_{11}], \vec{y} = [Q_t]$$

For data collection and online training:

$$m_k(\text{binary}) = \begin{cases} 0 & QPSK \\ 1 & 16QAM \end{cases}$$

$$p_k = \begin{cases} -1000 \text{ dBm if channel } k \text{ is off} \\ [-5 \text{ dBm}, +6 \text{ dBm}] \text{ power range if channel } k \text{ is on} \end{cases}$$

In the example, a training set included 2640 samples, and a validation set included 330 samples.

One advantage of transfer learning is that a large training data size is not needed for the target system. For example, only 20 training samples may be needed to fine-tune the weights for transfer learning in each target domain system. For the 4-span LEAF 16QAM system, the only difference from the source domain system is the modulation format. Therefore, only the weights of a last hidden layer can be tuned. In one example, a 0.42 dB Q-factor prediction accuracy is achieved with the RMSE of 0.10 dB. Using a pre-trained neural network with weights already tuned, the training size is much smaller and training speed is much faster.

Any target system 105 can be employed to use the source based neural network. Only the way of retuning/reconstructing the neural network coefficients is slightly different depending on the use case. For example, for the 2-span LEAF 16QAM system, it is found that an additional hidden layer with, e.g., 60 neurons needed to be added and the weights of last two neural network layers are tuned. The Q-factor prediction accuracy and RMSE were 0.37 dB and 0.10 dB, respectively. A 3-span dispersion shifted fiber (DSF) QPSK system was also investigated. To get the best Q-factor prediction accuracy, a hidden layer with, e.g., 60 neurons needed to be added and the weights of all layers needed to be tuned. A 0.67 dB Q-factor prediction accuracy and 0.25 dB RMSE was obtained.

If the training samples are not sufficient, new data collection 114 may be needed. In that case, new data, measured data or generated data, e.g., using a software defined networking (SDN) controller 114, can be employed on the top of the transmission system 100. The SDN 114 can orchestrate different devices to automate the data collection. An incremental learning method can be applied to the SDN controller 114 so that new input data is continuously used to extend the existing neural network model 100. This training method can be applied to any system. In a complicated system, a large amount of data is needed to train the neural network model 101. The amount of data needed may not be known. To save time and to ensure sufficient data, the SDN 114 can be employed. With the incremental learning method using measured or generated data, the model's accuracy can improve over the time when more training data becomes available, and the SDN controller 114 can stop the data collection when the accuracy starts saturating.

Transfer learning methods can be applied to the neural network model to include transferable knowledge 102 of the QPSK system 100 to other QPSK/16QAM systems without the need for retraining. This can be provided for other systems with different architectures and modulation formats as well.

The performance of other systems can be predicted, with a small amount of new input and output pairs. Although different systems may perform differently due to different amounts of physical layer impairments, there are common patterns which all systems follow. For example, in optical systems, XPM is proportional to the number of lit channels for any modulated system; higher launch power leads to higher nonlinearity; lower launch power leads to lower optical signal to noise ratio, etc. Therefore, these common patterns become transferable knowledge 102 that can be used and applied to other systems.

The neural network 101 can be further refined or fine-tuned using fine tuning transfer learning 103 for target specific information or data. With only a small amount of additional data from the target domain 105, fine tuning transfer learning 103 and the transferable knowledge 102, a customer model 104 can be built. The new model 104 can be applied to predict the performance of the target domain 105 with a high degree of accuracy.

Figure 2:
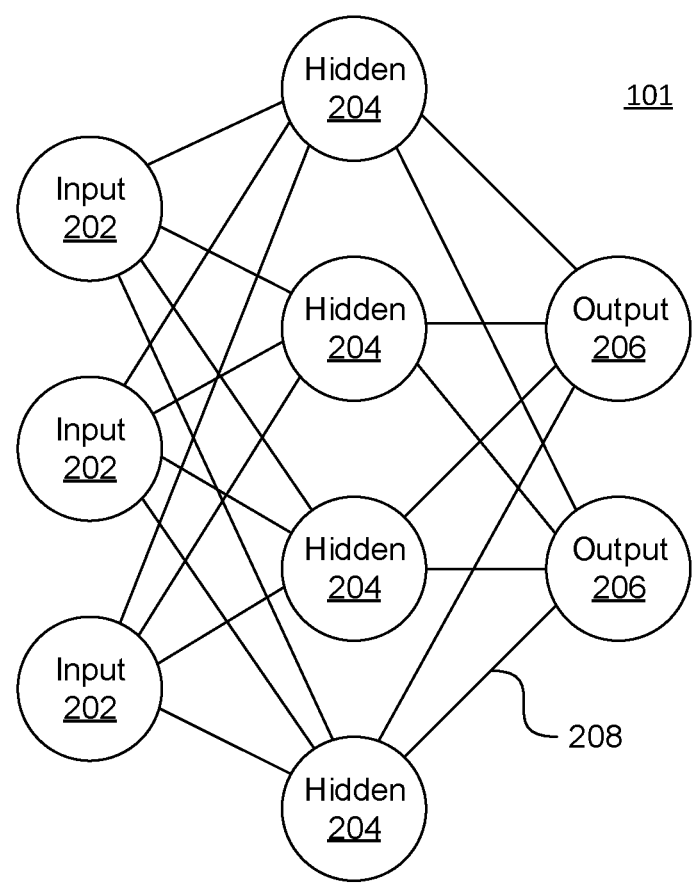
FIG. 2 is a schematic diagram illustrating a neural network in accordance with the present invention.

Referring to FIG. 2, a neural network is illustratively shown. The neural network model 101 derives meaning from complicated or imprecise data and can be used to extract patterns and detect trends that are too complex to be detected by humans or other computer-based systems. The structure of the neural network model 101 includes input neurons 202 that provide information to one or more "hidden" neurons 204. The neural network can include a single hidden layer or multiple hidden layers. Connections 208 between the input neurons 202 and hidden neurons 204 are weighted, and these weighted inputs are then processed by the hidden neurons 204 according to some function in the hidden neurons 204, with weighted connections 208 between the layers. There may be any number of layers of hidden neurons 204, and as well as neurons that perform different functions. There exists different neural network structures that can be employed as well, such as convolutional neural network, maxout network, etc.

A set of output neurons 206 accepts and processes weighted input from the last set of hidden neurons 204. This represents a "feed-forward" computation, where information propagates from input neurons 202 to the output neurons 206. Upon completion of a feed-forward computation, the output is compared to a desired output available from training data. The error relative to the training data is then processed in "feed-back" computation, where the hidden neurons 204 and input neurons 202 receive information regarding the error propagating backward from the output neurons 206. Once the backward error propagation has been completed, weight updates are performed, with the weighted connections 208 being updated to account for the received error. The error formulations once-trained provide the decoding formula for the transmission system (e.g., source domain 100 or the target domain 105 depending on the stage of training).

It should be understood that any number of these stages may be implemented, by interposing additional layers of arrays and hidden neurons 204. It should also be noted that some neurons may be constant neurons. The constant neurons can be present among the input neurons 202 and/or hidden neurons 204 and are only used during feed-forward operation.

During back propagation, the output neurons 206 provide a signal back across the weighted connections 208. An output layer compares the generated network response to training data and computes an error. The error is applied to the array proportionally to the error value. In this example, the back-propagation travels through the entire neural network 104 until all hidden neurons 204 and the input neurons 202 have stored an error value.

During weight update mode, after both forward and backward passes are completed, each weight is updated proportionally to the product of the signal passed through the weight during the forward and backward passes. Updates can be provided in both directions (though note that, for input and output neurons, only one direction will be available). The update generators are configured to change a state of the weights, such that the weights are updated.

In one embodiment, for training the source domain system neural network 101, a stochastic gradient descent with back-propagation can be applied to minimize a least root mean square error (RMSE) loss function. A neural network architecture can be generalized to have single or multiple hidden layers. In one embodiment, the neural network architecture can include 3 hidden layers (with e.g., 120, 120, and 60 neurons, respectively) using a combination of, e.g., Relu activation functions.

It should be noted that the three modes of operation, feed forward, back propagation, and weight update, do not overlap with one another. However, because the different phases do not overlap, there will necessarily be some form of control mechanism within in the neurons to control which components are active. It should therefore be understood that there may be switches and other structures that are not shown in the neurons to handle switching between modes.

The weights may be implemented in software or in hardware, for example using relatively complicated weighting circuitry or using resistive adjustable devices (e.g., resistive processing unit (RPU)).

Figure 3:
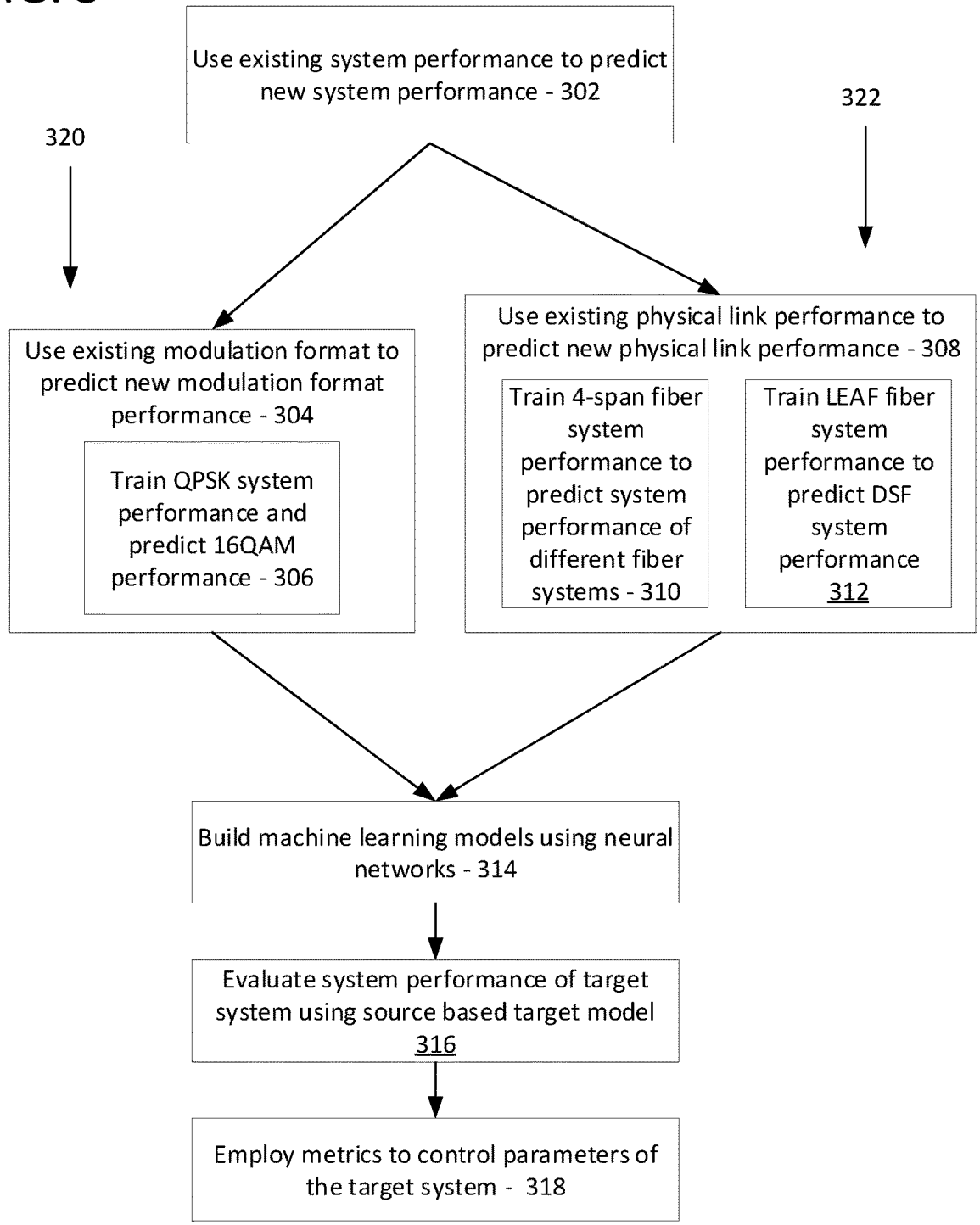
FIG. 3 is a block/flow diagram illustrating another system/method for training and operating a neural network for system performance evaluations of a target system based on source system training in accordance with the present invention.

Referring to FIG. 3, self-phase modulation (SPM) and cross-phase modulation (XPM) are two main types of fiber nonlinear effects, which can highly degrade the system performance (e.g. degradation of channel's quality factor (Q-factor)). The impact of SPM and XPM can vary with different system architecture and channel loadings. SPM and XPM, among other modulations types are difficult to predict. These can vary greatly between different system architectures. The subtleties and variations can be predicted, e.g., predicts QoT using the neural network 101. The present embodiments can predict system performance considering the complexity of SPM and XPM and other characteristics.

In block 302, existing system performance is employed to predict a new system performance or a same system performance. This can include using existing modulation format performance, physical link performance or other system metrics. In block 304, existing modulation format performance is used to predict new modulation format performance. In the illustrative example given, a QSPK modulation can be used to train the neural network to create a 16QAM prediction system in block 306.

In block 308, performance of existing physical links is trained in the neural network and employed to predict new physical link performance. Physical links can include optical fiber types, transmission system hardware (receiver or transmitter types, etc.), optical fiber spans, cable systems, etc.

In block 310, performance of a 4-span fiber system (e.g., an optical span includes an optical fiber/cable terminated at both ends which may include devices that add, subtract, or attenuate optical signals) can be used to train the neural network and then employed to predict performance of new fiber spans (8-span, etc.). In block 312, performance of a, e.g., large effective area fiber (LEAF) system (non-zero dispersion-shifted fiber (NZ-DSF)) can be used to train the neural network and then be employed to predict performance of a dispersion shifted fiber system (DSF). DSF includes is a type of optical fiber with both low dispersion and low attenuation.

In block 314, machine learning neural network model(s) are constructed and updated (neural networks) using the performance information. Different performance paths 320 and 322 can be employed to fine-tune and transfer knowledge to the neural network to provide a customer or target model. While paths 320 and 322 are illustrative, other paths can be employed to address other features and possibilities of the model(s).

In the example, the source domain system 100 is a multi-span system with a commercially available modulation format (e.g., QPSK) with the defined input (e.g. channel input power) and system performance (e.g. channel Q-factor) as output. The training samples can be acquired from the historic database or from collecting new data. Transfer learning is employed to accurately predict performance (e.g., the channel Q-factor) of different systems. A pre-trained neural network can be obtained by training the network provider testbed (source domain systems). The pre-trained neural network is then used as a starting point for different customer systems (target domains). In that way, the needed amount of training data from the customer systems can be greatly reduced.

The customer or target neural network model 104 includes a relationship between the output and input, which can be learned by using backpropagation training on the training data, trying to minimize the differences between predicted performance information and the historic or measured performance data.

The neural network model 104 includes a large number of highly interconnected processing elements (called "neurons") working in parallel to solve specific problems. Learning by the neural network model 104 involves adjustments to weights that exist between the neurons. The neural network model 104 is configured for a specific application, e.g., learning a function for predicting system performance under different conditions than the trained model through the learning process.

In block 316, system performance of target system can be evaluated using a source-based target model. The neural network acts as a meter to provide contemporaneous performance measurements based on past performance as an indication to access the system's current performance. In block 318, metrics to control parameters of the target system can be employed as feedback to improve the system performance. It should be understood that the training and the performance evaluation need not be performed together on a same system or at the same. In useful embodiments, the training (or most training) is performed on a different system than the system being evaluated. Training and evaluation are likely to be performed at different times.

Figure 4:
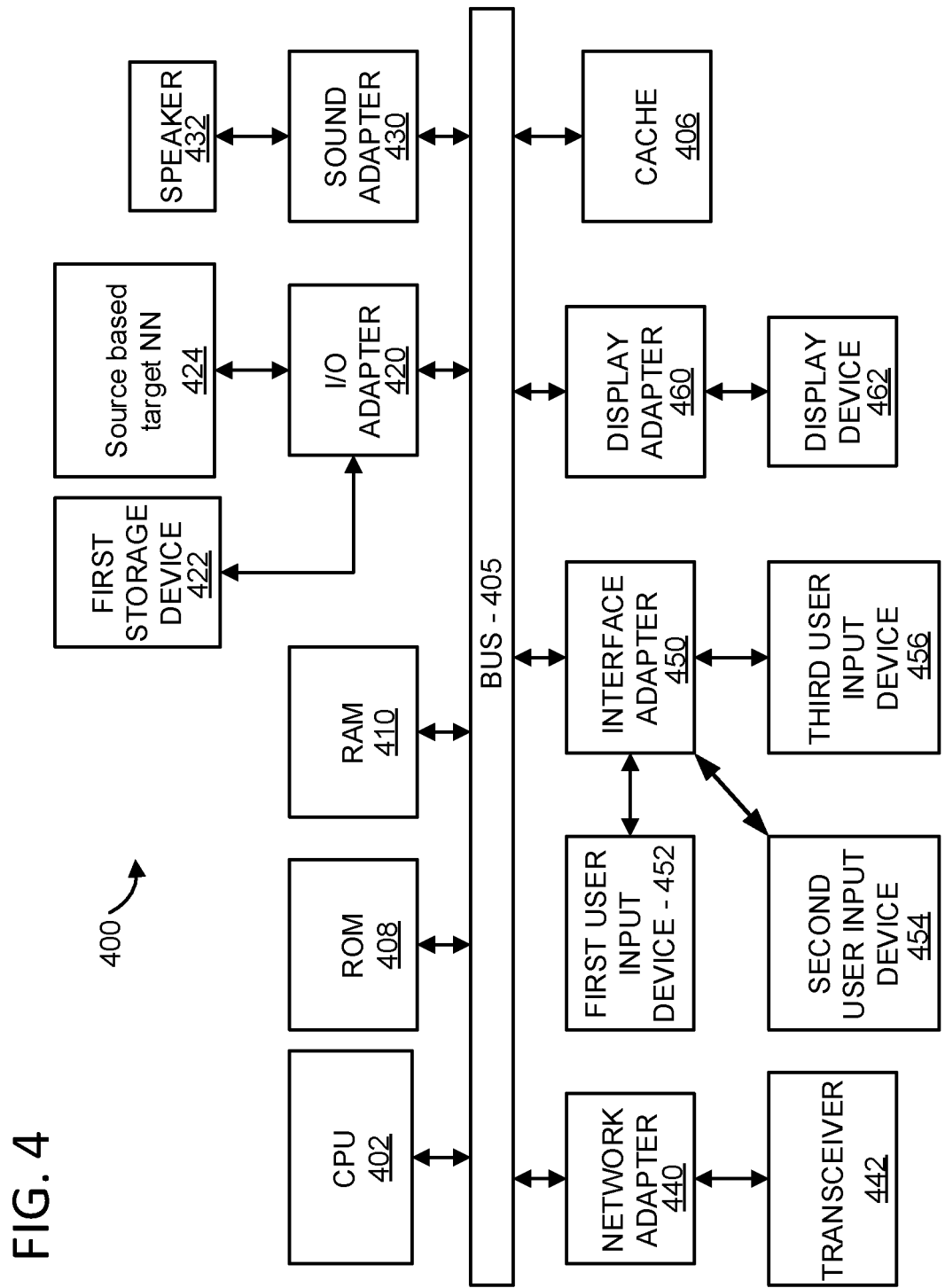
FIG. 4 is a block/flow diagram illustrating a system/method for neural network training and/or performance evaluation in accordance with one embodiment of the present invention.

Referring to FIG. 4, an exemplary processing system 400 to which the present invention may be applied is shown in accordance with one embodiment. The processing system 400 can be employed for training a neural network or in conjunction with a performance prediction system for a target system. The neural network can be implemented in hardware (e.g., an RPU device) or software. The processing system 400 can also be employed as or with a transceiver device 442 to exchange data to or from a transmission line or system (not shown). The processing system 400 includes at least one processor (CPU) 402 operatively coupled to other components via a system bus 405. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 405.

A first storage device 422 and a neural network or target model 424, which can be stored in memory, are operatively coupled to system bus 405 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices. The first storage device 422 can include historical system performance data, transferable knowledge, fine-tuning knowledge, etc. This information may also be made available from or over a network through the network adapter 440 and transceiver 442.

An optional speaker 432 is operatively coupled to system bus 405 by the sound adapter 430. A receiver 442 is operatively coupled to system bus 405 by network adapter 440. In some embodiments, a transceiver or transmitter may also be employed and connected to the system bus 405 through a network adapter. A display device 462 can optionally be included and operatively coupled to system bus 405 by display adapter 460.

A first user input device 452, a second user input device 454, and a third user input device 456 are operatively coupled to system bus 405 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 452, 454, and 456 can be the same type of user input device or different types of user input devices. The user input devices 452, 454, and 456 are used to input and output information to and from system 400. In one embodiment, at least one of the user input devices 452, 454, and 456 includes an SDN to generate system information.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of optical, wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

Figure 5:
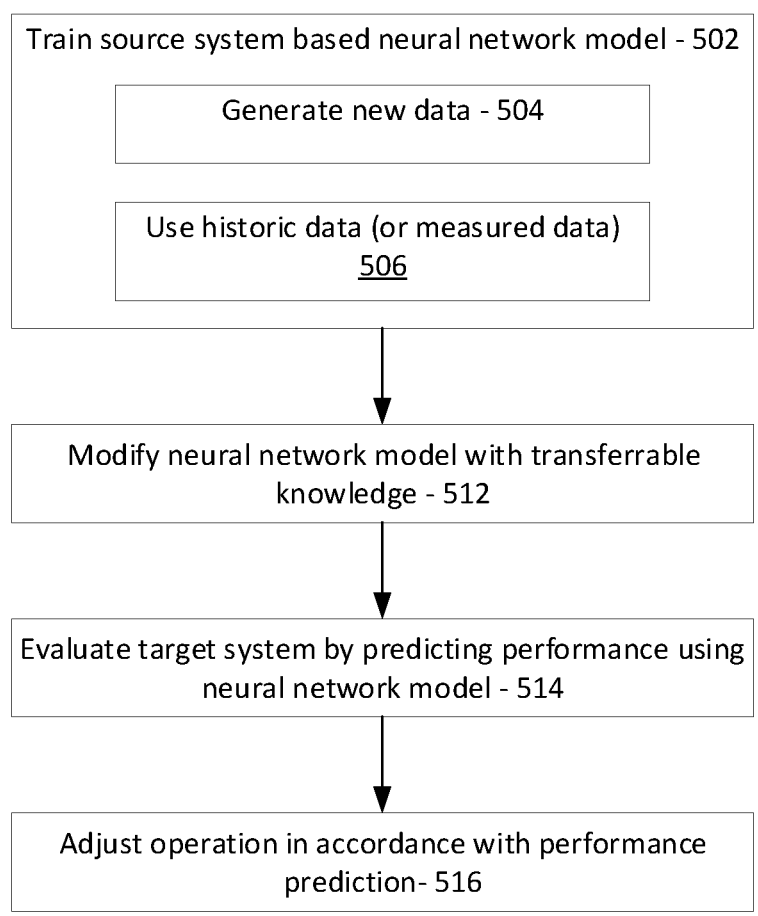
FIG. 5 is a flow diagram illustrating methods for training a sourced based target model in accordance with one embodiment of the present invention.

Referring to FIG. 5, methods for predicting performance of a modulation system are illustratively shown. In block 502, a neural network model is trained using performance information of a source system. The source system and the target system can be based on different modulation formats, different physical components, links, configurations or topologies. In one example, the source system includes quadrature phase shift keying ((QPSK) and the target system includes 16 quadrature amplitude modulation (16QAM). Other examples include different fiber spans, number or types of fibers, BER, SNR, etc.

In block 504, training the neural network model using performance information can include generating new data to train the neural network model. The new data can be generated by employing a software defined network (SDN) controller or other data generation device in block 506. In block 508, performance information can include historic data stored in a database or in other memory. In some embodiments, combinations of these data methods can be employed.

In block 510, the neural network model is modified with transferable knowledge about a target system to be evaluated. Transferrable knowledge can include any characteristics that are to be modeled. The characteristics can include physical characteristics (fiber types spans, links), attenuation, amplifications, channel quality, numbers of channels, data rates, noise, error rates, etc.

In block 512, the neural network model can be further tuned using specific characteristics of the target system to create a source-based target model. This fine-tuning can be performed for the target system and may be employed by a customer receiving the model. In one embodiment, a user of the target system can have specific parameters or concerns about the operation of the target system. Fine-tuning can be performed on the neural network using only a few training samples. This means that the target user only needs to tweak the model since the model includes a large number of samples to provide robustness. Since the model has already been trained on the source system with a large amount of data, the target user saves times and effort without leveraging accuracy.

In block 514, the target system performance is evaluated using the source-based target model to predict system performance of the target system. The performance prediction provides an accurate measure of one or more system metrics. The source-based target model can be distributed over a network where the model is transferred to target system users to predict system performance of the target system.

In block 516, operation parameters can be adjusted or otherwise controlled using predicted system performance of the target system as feedback. For example, predictions of QoT can be used to make adjustments to transmissions to improve the QoT. Other adjustments and parameters are also contemplated.

Figure 6:
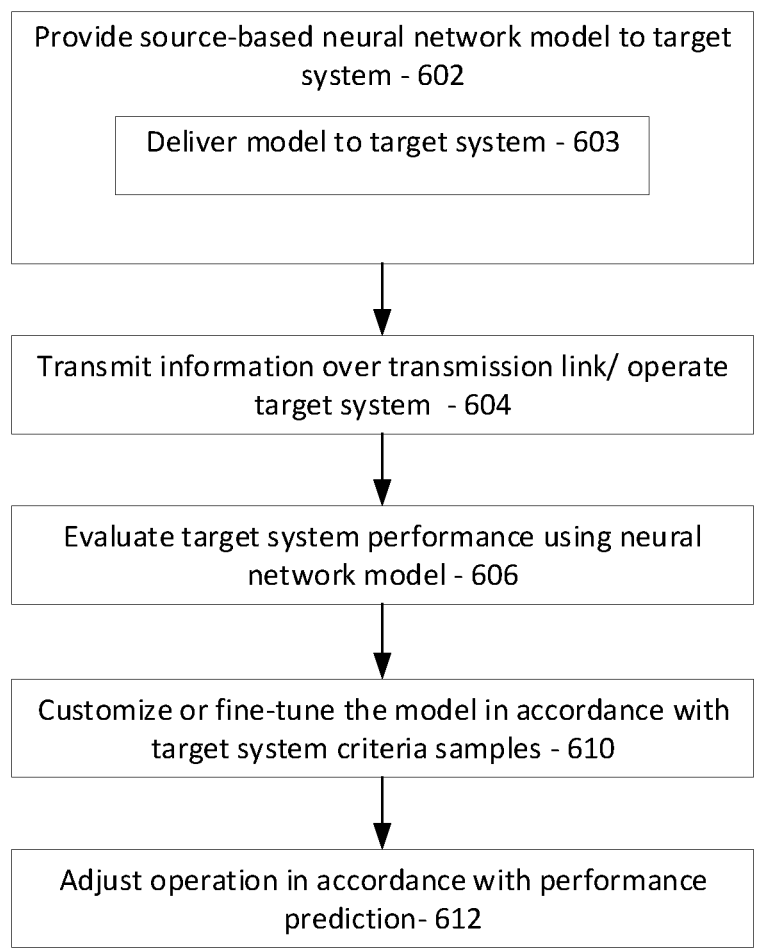
FIG. 6 is a flow diagram illustrating methods for evaluating performance characteristics of a target system using a sourced based target model in accordance with another embodiment of the present invention.

Referring to FIG. 6, methods for predicting performance of a modulation system are shown in accordance with other embodiments. In block 602, a source-based neural network target model is provided (e.g., to target owner) to predict system performance of a target system. The source system and the target system can be based on different modulation formats, topologies, physical links, etc. The source system can include, e.g., QPSK and the target system can include 16QAM. The training information of the source system can include historic or generated performance data of the source system, transferable knowledge of the target system and fine-tune learning of the target system. In block 603, the source-based target model can be sent or distributed over a network to target system users (e.g., to a customer) to predict system performance of the target system.

In block 604, the target system is operated to transmit information over a transmission link. In block 606, performance of the target system is evaluated using the source-based neural network target model to predict performance of the target system based upon training information of a source system.

In block 610, the target system users can customize the source-based neural network target model using training samples to fine-tune the source-based neural network target model. This can be done with fewer than 5% of the total training samples.

In block 612, operation parameters can be adjusted using predicted system performance of the target system as feedback. For example, predictions of QoT can be used to make adjustments to transmissions to improve the QoT. Other adjustments and parameters are also contemplated.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for predicting performance of a modulation system, comprising:
    training a neural network model using performance information of a source system;
    modifying the neural network model with transferrable knowledge about a target system to be evaluated;
    tuning the neural network model using specific characteristics of the target system to create a source-based target model; and
    evaluating the target system performance using the source-based target model to predict system performance of the target system,
    wherein the source system and the target system are based on different modulation formats.

2. The method as recited in claim 1, wherein the source system includes a quadrature phase shift keying ((QPSK) and the target system includes 16 quadrature amplitude modulation (16QAM).

3. The method as recited in claim 1, wherein training the neural network model using performance information includes generating new data to train the neural network model.

4. The method as recited in claim 3, wherein generating the new data includes employing software defined network (SDN) controller.

5. The method as recited in claim 1, wherein training the neural network model using performance information includes employing historic data stored in a database.

6. The method as recited in claim 1, wherein the source-based target model is distributed over a network to target system users to predict system performance of the target system.

7. The method as recited in claim 1, further comprising adjusting operation parameters using predicted system performance of the target system as feedback.

8. A method for predicting performance of a modulation system, comprising:
    providing a source-based neural network target model to predict system performance of a target system;
    operating the target system to transmit information over a transmission link;
    evaluating performance of the target system using the source-based neural network target model to predict performance of the target system based upon training information of a source system; and
    adjusting operation parameters using predicted system performance of the target system as feedback.

9. The method as recited in claim 8, wherein the source system and the target system are based on different modulation formats.

10. The method as recited in claim 8, wherein the source system includes a quadrature phase shift keying ((QPSK) and the target system includes 16 quadrature amplitude modulation (16QAM).

11. The method as recited in claim 8, wherein the training information of the source system includes historic performance data of the source system, transferrable knowledge of the target system and fine-tune learning of the target system.

12. The method as recited in claim 8, wherein the source-based target model is distributed over a network to target system users to predict system performance of the target system.

13. The method as recited in claim 12, wherein the target system users customize the source-based neural network target model using training samples to fine-tune the source-based neural network target model.

14. A transmission modulation system, comprising:
    a target domain coupled to a transmission link, the target domain having first transmission system operating characteristics; and
    a target performance model associated with the target domain and including a neural network to predict performance of the target system, the neural network being constructed based upon training information having second transmission system operating characteristics of a source system, wherein the first transmission system operating characteristics and the second transmission system operating characteristics are different,
wherein the first transmission system operating characteristics and the second transmission system operating characteristics are based on different modulation formats.

15. The system as recited in claim 14, wherein the first transmission system operating characteristics include a quadrature phase shift keying ((QPSK) and the second transmission system operating characteristics include 16 quadrature amplitude modulation (16QAM).

16. The system as recited in claim 14, wherein the second transmission system operating characteristics are predicted by the target performance model.

17. The system as recited in claim 14, wherein the target performance model predicts the second transmission system operating characteristics, which includes a characteristic selected from the group consisting of: power, quality factor, quality of transmission (QoT), bit error rate (BER), signal to noise ratio (SNR), a physical link and combinations thereof.

* * * * *